(12) United States Patent
Nakashima et al.

(10) Patent No.: US 11,883,770 B2
(45) Date of Patent: Jan. 30, 2024

(54) POROUS COMPOSITE

(71) Applicant: NGK INSULATORS, LTD., Nagoya (JP)

(72) Inventors: Takuya Nakashima, Nagoya (JP); Shogo Takeno, Nagoya (JP); Yunie Izumi, Nisshin (JP)

(73) Assignee: NGK INSULATORS, LTD., Nagoya (JP)

( * ) Notice: Subject to any disclaimer, the term of this patent is extended or adjusted under 35 U.S.C. 154(b) by 232 days.

(21) Appl. No.: 17/445,340

(22) Filed: Aug. 18, 2021

(65) Prior Publication Data

US 2021/0379523 A1 Dec. 9, 2021

Related U.S. Application Data

(63) Continuation of application No. PCT/JP2019/013670, filed on Mar. 28, 2019.

(51) Int. Cl.
*B01D 46/24* (2006.01)
*B01D 39/20* (2006.01)
(Continued)

(52) U.S. Cl.
CPC ..... *B01D 46/2429* (2013.01); *B01D 39/2068* (2013.01); *B01D 46/247* (2013.01);
(Continued)

(58) Field of Classification Search
CPC .......... B01D 46/24–26; B01D 46/2429; B01D 46/248; B01D 46/24491; B01D 46/2482;
(Continued)

(56) References Cited

U.S. PATENT DOCUMENTS 5,545,243 A 8/1996 Kotani et al.
5,634,952 A 6/1997 Kasai et al.
(Continued)

FOREIGN PATENT DOCUMENTS

EP 1842578 A2 * 10/2007 ......... B01D 46/2429
JP H07-163823 A 6/1995
(Continued)

OTHER PUBLICATIONS

English translation of the International Preliminary Report on Patentability (Chapter I) dated Oct. 7, 2021 (Application No. PCT/JP2020/013670.
(Continued)

*Primary Examiner* — Robert A Hopkins
(74) *Attorney, Agent, or Firm* — BURR PATENT LAW, PLLC

(57) ABSTRACT

In a porous composite, a base material has a honeycomb structure whose inside is partitioned into a plurality of cells. In the plurality of cells, a plurality of first cells whose one ends in the longitudinal direction are sealed, and a plurality of second cells whose other ends in the longitudinal direction are sealed are arranged alternately. A collection layer covers inner surfaces of the plurality of first cells. An overall Sa that is an arithmetical mean height Sa indicating a surface roughness of a surface of the collection layer in the plurality of first cells is greater than or equal to 0.1 μm and less than or equal to 12 μm. An overall mean thickness that is a mean thickness of the collection layer in the plurality of first cells is greater than or equal to 10 μm and less than or equal to 40 μm.

10 Claims, 5 Drawing Sheets

(51) Int. Cl.
   *C04B 38/00*   (2006.01)
   *F01N 3/022*   (2006.01)
(52) U.S. Cl.
   CPC ....... *B01D 46/248* (2021.08); *B01D 46/2462* (2013.01); *B01D 46/2482* (2021.08); *B01D 46/24491* (2021.08); *B01D 46/24492* (2021.08); *C04B 38/0006* (2013.01); *C04B 38/0054* (2013.01); *C04B 38/0096* (2013.01); *F01N 3/022* (2013.01); *B01D 2239/0478* (2013.01); *B01D 2239/1208* (2013.01); *B01D 2239/1216* (2013.01); *B01D 2279/30* (2013.01)
(58) Field of Classification Search
   CPC .......... B01D 46/24492; B01D 46/2462; B01D 46/247; B01D 39/2068; B01D 2239/0478; B01D 2239/1208; B01D 2239/1216; B01D 2279/30; C04B 38/0006; C04B 38/0054; C04B 38/0096; F01N 3/022
   USPC ......................................................... 55/523
   See application file for complete search history.

(56) References Cited

U.S. PATENT DOCUMENTS

| | | |
|---|---|---|
| 2004/0137194 A1 | 7/2004 | Fukao et al. |
| 2006/0166820 A1 | 7/2006 | Ogyu et al. |
| 2009/0142543 A1 | 6/2009 | Suwabe et al. |
| 2010/0044300 A1 | 2/2010 | Yamaguchi |
| 2011/0203242 A1 | 8/2011 | Goto et al. |
| 2011/0212831 A1 | 9/2011 | Goto et al. |
| 2012/0070346 A1* | 3/2012 | Mizutani ............ B01D 46/2482 422/178 |
| 2013/0055694 A1 | 3/2013 | Salmona et al. |

FOREIGN PATENT DOCUMENTS

| | | | |
|---|---|---|---|
| JP | H08-000931 A | | 1/1996 |
| JP | 2011-139975 A | | 7/2011 |
| JP | 2011-147931 A | | 8/2011 |
| JP | 2011-189246 A | | 9/2011 |
| JP | 2011189246 A | * | 9/2011 |
| JP | 2013-039513 A | | 2/2013 |
| JP | 2013-527025 A | | 6/2013 |
| WO | 03/080539 A1 | | 10/2003 |
| WO | 2004/076027 A1 | | 9/2004 |
| WO | 2008/047558 A1 | | 4/2008 |
| WO | 2008/093727 A1 | | 8/2008 |

OTHER PUBLICATIONS

International Search Report and Written Opinion (Application No. PCT/JP2019/013670) dated Jul. 2, 2019.
German Office Action (with English translation) dated Aug. 2, 2022 (Application No. 11 2019 007 100.9).
English translation of the International Preliminary Report on Patentability (Chapter I) dated Oct. 7, 2021 (Application No. PCT/JP2019/013670).

* cited by examiner

POROUS COMPOSITE

CROSS-REFERENCE TO RELATED APPLICATION

The present application is a continuation application of International Application No. PCT/JP2019/013670 filed on Mar. 28, 2019. The entire contents of this application are incorporated herein by reference.

TECHNICAL FIELD

The present invention relates to a porous composite.

BACKGROUND ART

Gases exhausted from internal combustion engines such as diesel engines or various combustion apparatuses contain particulate matter such as soot. Hence, vehicles or other equipment that mount diesel engines are provided with filters for collecting particulate matter in exhaust gases. As one of these filters, a honeycomb structure is used in which some of cells of a porous honeycomb base material have sealing parts at openings on their outlet side, and the remaining cells have sealing parts at openings on their inlet side.

Recently, it has been proposed to collect particulate matter contained in the exhaust gas from a gasoline engine by using the above-mentioned honeycomb structure as a filter. For example, Japanese Patent Application Laid-Open No. 2011-139975 (Document 1) proposes a honeycomb structure that collects particulate matter contained in the exhaust gas of a direct-injection gasoline engine with high collection efficiency while suppressing an increase in pressure loss. In Japanese Patent Application Laid-Open No. 2011-147931 (Document 2), a technique for improving the collection efficiency by forming a surface collection layer on the surface of the partition wall in the honeycomb structure is proposed.

At present, in the honeycomb structure used as the above filter, it is required to achieve both further suppression of increase in pressure loss and high collection efficiency of particulate matter.

SUMMARY OF INVENTION

The present invention is intended for a porous composite, and it is an object of the present invention to reduce pressure loss and improve collection efficiency of particulate matter.

The porous composite according to a preferred embodiment of the present invention includes a porous base material, and a porous collection layer formed on the base material. The base material has a honeycomb structure whose inside is partitioned by a partition wall into a plurality of cells extending in a longitudinal direction. The plurality of cells include a plurality of first cells whose one ends in the longitudinal direction are sealed, and a plurality of second cells whose other ends in the longitudinal direction are sealed, the plurality of first cells and the plurality of second cells being arranged alternately. The collection layer covers inner surfaces of the plurality of first cells. An overall Sa that is an arithmetical mean height Sa indicating a surface roughness of a surface of the collection layer in the plurality of first cells is greater than or equal to 0.1 µm and less than or equal to 12 µm. An overall mean thickness that is a mean thickness of the collection layer in the plurality of first cells is greater than or equal to 10 µm and less than or equal to 40 µm. The porous composite can reduce pressure loss and improve collection efficiency.

Preferably, an outlet-side Sa that is an arithmetical mean height Sa of the surface of the collection layer at end portions in the plurality of first cells is greater than or equal to 0.1 µm and less than or equal to 15 µm, the end portions being located on a side of the one ends in the longitudinal direction.

Preferably, an outlet-side mean thickness that is a mean thickness of the collection layer at the end portions in the plurality of first cells is greater than or equal to 35 µm and less than or equal to 50 µm.

Preferably, the collection layer in the plurality of first cells has a mean pore diameter greater than or equal to 0.1 µm and less than or equal to 20 µm.

Preferably, the collection layer in the plurality of first cells has a porosity greater than or equal to 50% and less than or equal to 90%.

Preferably, an aggregate of the collection layer in the plurality of first cells has a mean particle diameter greater than or equal to 0.1 µm and less than or equal to 5 µm.

Preferably, the collection layer in the plurality of first cells contains at least one of silicon carbide, cordierite, mullite, aluminum oxide, silicon oxide, titanium oxide, zirconium oxide, iron oxide, and cerium oxide.

Preferably, the collection layer doesn't exist in the plurality of second cells.

Preferably, a chief material of the partition wall is cordierite. The partition wall has a mean pore diameter greater than or equal to 5 µm and less than or equal to 30 µm. The partition wall has a porosity greater than or equal to 30% and less than or equal to 70%.

Preferably, the porous composite is a gasoline particulate filter for collecting particulate matter in an exhaust gas emitted from a gasoline engine.

These and other objects, features, aspects and advantages of the present invention will become more apparent from the following detailed description of the present invention when taken in conjunction with the accompanying drawings.

DESCRIPTION OF EMBODIMENTS

Figure 1:
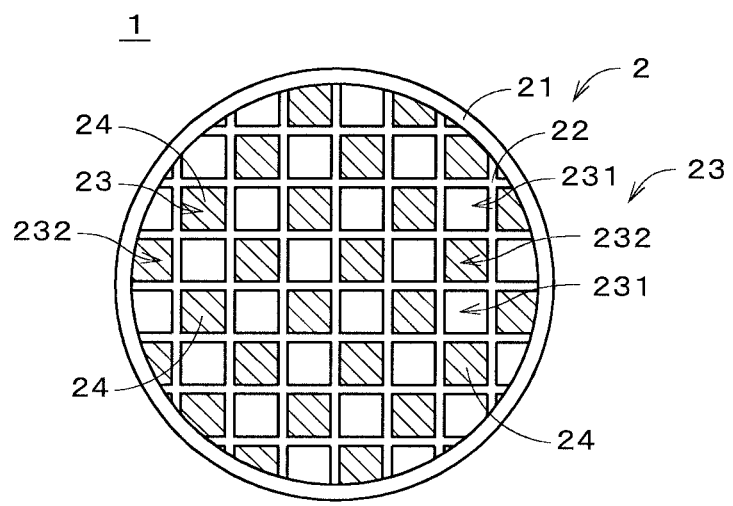
FIG. 1 is a plan view of a porous composite according to an embodiment.
Figure 2:
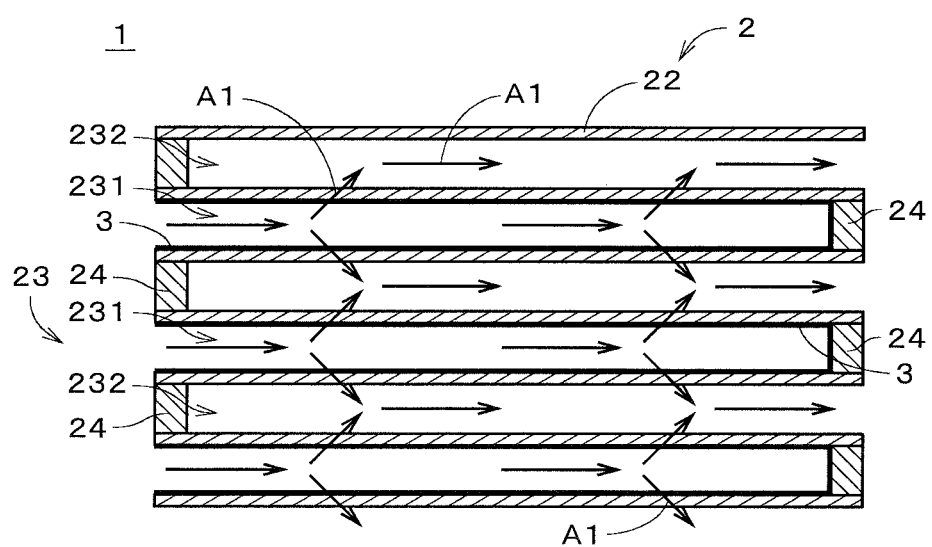
FIG. 2 is a sectional view of the porous composite.

FIG. 1 is a plan view illustrating a porous composite 1 according to one embodiment of the present invention in simplified form. The porous composite 1 is a tubular member that is long in one direction. In FIG. 1, the end face on one side in the longitudinal direction of the porous composite 1 is illustrated. FIG. 2 is a sectional view of the porous composite 1. In FIG. 2, part of a section taken along the longitudinal direction is illustrated. For example, the porous composite 1 is used as a gasoline particulate filter (GPF) for collecting particulate matter such as soot in the exhaust gas emitted from a gasoline engine of a vehicle and the like.

The porous composite 1 includes a porous base material 2 and a porous collection layer 3. In the example illustrated in FIGS. 1 and 2, the base material 2 is a member having a honeycomb structure. The base material 2 includes a tubular outer wall 21 and a partition wall 22. The tubular outer wall 21 is a tubular portion that extends in the longitudinal direction (i.e., the left-right direction in FIG. 2). The tubular outer wall 21 has, for example, a generally circular sectional shape perpendicular to the longitudinal direction. This sectional shape may be any other shape such as a polygonal shape.

The partition wall 22 is a grid-shaped portion that is provided inside the tubular outer wall 21 and partitions the inside into a plurality of cells 23. Each of the cells 23 is a space extending in the longitudinal direction. Each cell 31 has, for example, a generally square sectional shape perpendicular to the longitudinal direction. This sectional shape may be any other shape such as a polygonal shape or a circular shape. These cells 23 have the same sectional shape as a general rule. Alternatively, these cells 23 may include cells 23 that have different sectional shapes. The base material 2 is a cell structure whose inside is partitioned into the cells 23 by the partition wall 22.

The tubular outer wall 21 and the partition wall 22 are both porous portions. The tubular outer wall 21 and the partition wall 22 are formed of, for example, ceramic. The chief material of the tubular outer wall 21 and the partition wall 22 is preferably cordierite ($2MgO \cdot 2Al_2O_3 \cdot 5SiO_2$). The material of the tubular outer wall 21 and the partition wall 22 may be ceramic other than cordierite, or may be a material other than ceramic.

The tubular outer wall 21 has a length of, for example, 50 mm to 300 mm in the longitudinal direction. The outside diameter of the tubular outer wall 21 is, for example, in the range of 50 mm to 300 mm. The thickness of the tubular outer wall 21 is, for example, greater than or equal to 30 micrometers (μm) and preferably greater than or equal to 50 μm. The thickness of the tubular outer wall 21 is also, for example, less than or equal to 1000 μm, preferably less than or equal to 500 μm, and more preferably less than or equal to 350 μm.

The length of the partition wall 22 in the longitudinal direction is generally the same as that of the tubular outer wall 21. The thickness of the partition wall 22 is, for example, greater than or equal to 30 μm and preferably greater than or equal to 50 μm. The thickness of the partition wall 22 is also, for example, less than or equal to 1000 μm, preferably less than or equal to 500 μm, and more preferably less than or equal to 350 μm. The porosity of the partition wall 22 is, for example, greater than or equal to 20% and preferably greater than or equal to 30%. The porosity of the partition wall 22 is also, for example, less than or equal to 80% and preferably less than or equal to 70%. The porosity can be measured by, for example, Archimedes method using deionized water as a medium. The mean pore diameter of the partition wall 22 is, for example, greater than or equal to 5 μm and preferably greater than or equal to 8 μm. The mean pore diameter of the partition wall 22 is also, for example, less than or equal to 30 μm and preferably less than or equal to 25 μm. The mean pore diameter can be measured by, for example, mercury porosimetry (compliant with JIS R 1655).

A cell density of the base material 2 (i.e., the number of cells 23 per unit area of a section perpendicular to the longitudinal direction) is, for example, greater than or equal to 10 cells/cm$^2$ (per square centimeter), preferably greater than or equal to 20 cells/cm$^2$, and more preferably greater than or equal to 30 cells/cm$^2$. The cell density is also, for example, less than or equal to 200 cells/cm$^2$ and preferably less than or equal to 150 cells/cm$^2$. In the illustration in FIG. 1, the sizes of the cells 23 are greater than the actual sizes, and the number of cells 23 is smaller than the actual number. The sizes and number of cells 23 may be changed in various ways.

In the case where the porous composite 1 is used as a GPF, a gas such as an exhaust gas flows through the inside of the porous composite 1, with one end side of the porous composite 1 in the longitudinal direction (i.e., the left side in FIG. 2) as an inlet and the other end side as an outlet. Some of the cells 23 of the porous composite 1 each have a sealing part 24 at the end portion on the inlet side, and the remaining cells 23 each have a sealing part 24 at the end portion on the outlet side.

FIG. 1 is an illustration of the inlet side of the porous composite 1. In FIG. 1, the sealing parts 24 on the inlet side are indicated by hatching in order to facilitate understanding of the drawing. In the example illustrated in FIG. 1, the cells 23 that have the sealing parts 24 on the inlet side and the cells 23 that do not have the sealing parts 24 on the inlet side (i.e., the cells 23 that have the sealing parts 24 on the outlet side) are arranged alternately in both the vertical and lateral directions in FIG. 1.

In the following description, the cells 23 that have the sealing parts 24 on the outlet side are referred to as "first cells 231," and the cells 23 that have the sealing parts 24 on the inlet side are referred to as "second cells 232." In the case where there is no need to distinguish between the first cells 231 and the second cells 232, the cells 23 are collectively referred to as "cells 23" as described previously. The cells 23 of the porous composite 1 include the first cells 231 whose one ends in the longitudinal direction are sealed, and the second cells 232 whose other ends in the longitudinal direction are sealed, the first cells 231 and the second cells 232 being arranged alternately.

The collection layer 3 is formed in film form on the surface of the base material 2. In the example illustrated in FIG. 2, the collection layer 3 is provided in the first cells 231 having the sealing parts 24 on the outlet side, and covers the inner surfaces of the first cells 231 (i.e., the surface of the partition wall 22). In FIG. 2, the collection layer 3 is indicated by the bold lines. The collection layer 3 also covers the inner surfaces of the sealing parts 24 on the outlet side in the first cells 231. On the other hand, the collection layer 3 doesn't exist in the second cells 232 having the sealing parts 24 on the inlet side. In other words, the inner surfaces of the second cells 232 are exposed without being covered with the collection layer 3.

The collection layer 3 in the first cells 231 is formed of, for example, ceramic. The collection layer 3 preferably contains, as its chief material, at least one of silicon carbide, cordierite, mullite, aluminum oxide, silicon oxide, titanium oxide, zirconium oxide, iron oxide, and cerium oxide. Note that the collection layer 3 may be formed of any other ceramic, or may be formed of a material other than ceramic.

The mean pore diameter of the collection layer 3 is preferably greater than or equal to 0.1 μm and less than or equal to 20 μm. The mean pore diameter is more preferably greater than or equal to 4.1 µm and less than or equal to 20 µm, and yet more preferably greater than or equal to 4.1 µm and less than or equal to 6 µm. The porosity of the collection layer 3 is preferably greater than or equal to 50% and less than or equal to 90%. The porosity is more preferably greater than or equal to 70% and less than or equal to 78%. The mean particle diameter of an aggregate constituting the collection layer 3 is preferably greater than or equal to 0.1 µm and less than or equal to 5 µm. The mean particle diameter is more preferably greater than or equal to 0.4 µm and less than or equal to 5 µm.

Figure 3:
FIG. 3 is a schematic diagram corresponding to an SEM image of a section of a collection layer and a base material.

The mean pore diameter and porosity of the collection layer 3 and the mean particle diameter of the aggregate can be obtained by the following method. First, the porous composite 1 is processed by a cross-section polisher (CP) to expose a polished section including the collection layer 3 and the base material 2. This polished section is imaged with a scanning electron microscope (SEM) at a predetermined magnification (e.g., 1000× magnification) to obtain an SEM image. FIG. 3 is a schematic diagram corresponding to the SEM image. Then, this SEM image is analyzed using an image analysis software "Image-Pro version 9.3.2" manufactured by Nippon Roper Co. Ltd., and thus, the mean pore diameter and porosity of the collection layer 3 and the mean particle diameter of the aggregate can be obtained.

Figure 4:
FIG. 4 is a schematic diagram corresponding to the SEM image of the section of the collection layer and the base material.

Specifically, as shown in the schematic diagram of FIG. 4, in a region of the SEM image where the collection layer 3 exists, straight lines 91 extending parallel to the surface of the base material 2 are arranged in the direction orthogonal to the straight lines 91. One pixel of the SEM image corresponds to 0.1 µm×0.1 µm. The width of each straight line 91 corresponds to one pixel of the SEM image, and the width in the example illustrated in FIG. 4 is 0.1 µm. Next, in each region in which bright parts (i.e., the aggregate of the collecting layer 3) are connected to one another on the straight line 91 (hereinafter, the region is referred to as a "bright region"), the area is calculated. Additionally, in each region in which dark parts (i.e., pores of the collecting layer 3) are connected to one another on the straight line 91 (hereinafter, the region is referred to as a "dark region"), the area is calculated. In the area calculation of the bright regions and the dark regions, a region having a width of 0.2 µm (i.e., a region having a width of two pixels) is extracted by each straight line 91. Specifically, each straight line 91 having a width of 0.1 µm is placed on the boundary line between two pixel rows adjacent to each other in the width direction (i.e., rows of a plurality of pixels arranged in a direction perpendicular to the width direction). All pixels that overlap with any straight line 91 are subject to the area calculation. The area of each region of the bright regions and dark regions is calculated in unit of 0.01 µm², and the region having an area less than 0.05 µm² (i.e., region having four pixels or less) is ignored as noise. Then, the arithmetic mean of the areas of the dark regions is obtained as the area of pore extracted by the straight lines 91. The area of pore is the integrated value of the pore diameter and the pore width (i.e., 0.2 µm corresponding to two pixels) defined by the straight line 91. Thus, the mean pore diameter of the collection layer 3 is calculated by dividing the above-mentioned arithmetic mean of the areas of the dark regions by 0.2 µm (i.e., the pore width). The porosity of the collection layer 3 is calculated by dividing the total area of the dark regions by the sum of the total area of the bright regions and the total area of the dark regions.

Figure 5:
FIG. 5 is a schematic diagram corresponding to the SEM image of the section of the collection layer and the base material.

As shown in the schematic view of FIG. 5, a part of the collection layer 3 in the SEM image is cut out as a rectangular region 92, and the Feret diameter (JIS Z 8827-1) of each bright part (i.e., each aggregate particle) in the rectangular region 92 is measured. Specifically, when an aggregate particle is sandwiched between two parallel straight lines extending in a predetermined direction (e.g., left-right direction) in the rectangular region 92 so that the two straight lines circumscribe the aggregate particle, the Feret diameter is an interval between these two straight lines (i.e., the distance between the two straight lines in a direction perpendicular to the two straight lines). Then, the arithmetic mean of the Feret diameters of all aggregate particles is obtained as the mean particle diameter of the aggregate particles.

With respect to the overall surface of the collection layer 3, the arithmetic mean height Sa (hereinafter, referred to as an "overall Sa") indicating the surface roughness of the surface is preferably greater than or equal to 0.1 µm and less than or equal to 12 µm. The overall Sa is more preferably greater than or equal to 0.1 µm and less than or equal to 10 µm. In the surface of the collection layer 3, the arithmetical mean height Sa at the end portion on the outlet side where the gas flows out (hereinafter, referred to as an "outlet-side Sa") is greater than or equal to 0.1 µm and less than or equal to 15 µm. The outlet-side Sa is more preferably greater than or equal to 0.1 µm and less than or equal to 10 µm.

The mean thickness across the collection layer 3 (hereinafter, referred to as an "overall mean thickness") is preferably greater than or equal to 10 µm and less than or equal to 40 µm. The overall mean thickness is more preferably greater than or equal to 30 µm and less than or equal to 40 µm. The mean thickness of the collection layer 3 at the above-mentioned end portion on the outlet side (hereinafter, referred to as an "outlet-side mean thickness") is greater than or equal to 20 µm and less than or equal to 50 µm. The outlet-side mean thickness is more preferably greater than or equal to 35 µm and less than or equal to 50 µm. Preferably, the outlet-side mean thickness is greater than the overall mean thickness.

The arithmetical mean height Sa of the surface of the collection layer 3 and the mean thickness of the collection layer 3 are measured by a 3D-shape measuring device. Specifically, the porous composite 1 is cut with two planes parallel to the longitudinal direction to obtain a generally flat plate-shaped portion sandwiched between the two cross sections as a sample. The two cross sections face each other with a central axis of the porous composite 1 interposed therebetween, the central axis extending in the longitudinal direction, and at least one cross section includes the cells 23. The length of the sample in the longitudinal direction is the same as the length of the porous composite 1 in the longitudinal direction. The width of the sample in the width direction is the same as the diameter of the porous composite 1 (i.e., the outside diameter of the tubular outer wall 21).

Figure 6:
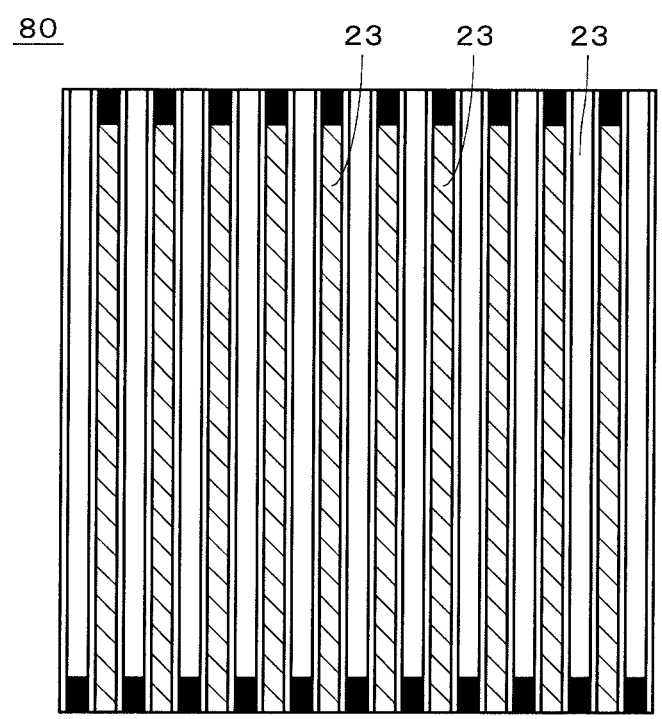
FIG. 6 is a view illustrating a sample.
Figure 7:
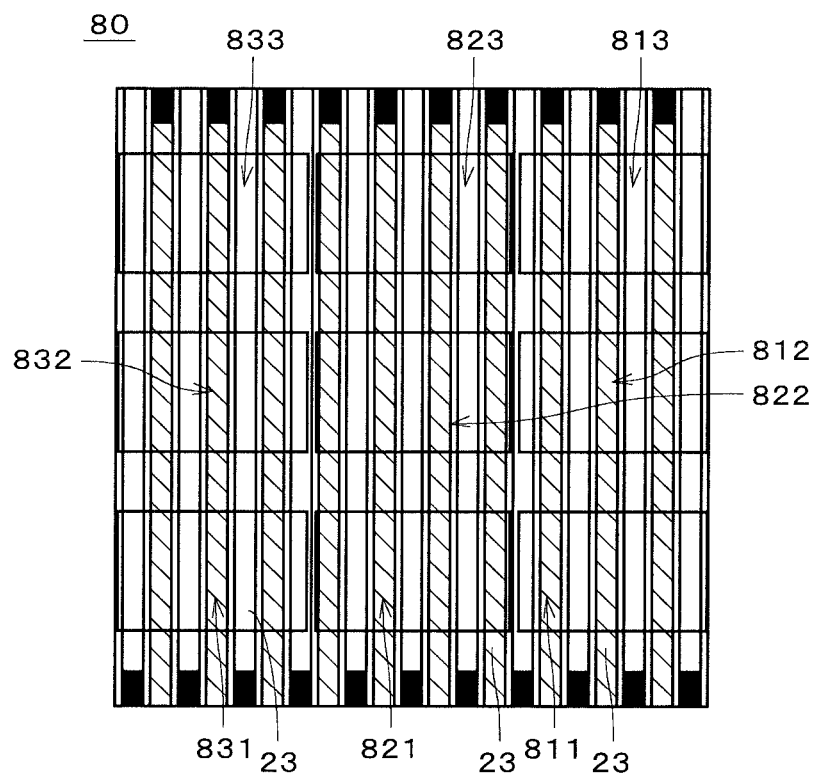
FIG. 7 is a view indicating measurement regions on the sample.

FIG. 6 is a view illustrating one main face of the obtained sample 80 (i.e., the longitudinal section of the porous composite 1). As shown in FIG. 6, in the generally rectangular sample 80, the cells 23 extending in the up-down direction in the drawing are arranged in the left-right direction in the drawing. The up-down direction and left-right direction in the drawing correspond to the longitudinal direction and the radial direction about the above-mentioned central axis (i.e., the width direction) in the porous composite 1, respectively. The lower side in the drawing corresponds to the above-mentioned inlet side, and the upper side in the drawing corresponds to the above-mentioned outlet side. In FIG. 6, and FIG. 7 described later, the cells 23 indicated by hatching are the cells 23 provided with the collection layer 3.

Subsequently, as shown in FIG. 7, in the longitudinal section of the porous composite 1 of FIG. 6, nine measurement regions 811 to 813, 821 to 823, and 831 to 833 are set on the sample 80. Each of the measurement regions 811 to 813, 821 to 823, and 831 to 833 is a generally rectangular region having a pair of sides parallel to the longitudinal direction of the sample 80 and a pair of sides parallel to the width direction. The measurement regions 821 to 823 are arranged in this order in the up-down direction from the lower side (i.e., the inlet side) at the center of the measurement image in the width direction. The measurement regions 811 to 813 are arranged in this order in the up-down direction from the lower side on the right side of the measurement regions 821 to 823. The measurement regions 831 to 833 are arranged in this order in the up-down direction from the lower side on the left side of the measurement regions 821 to 823. The width of each of the measurement regions 811 to 813, 821 to 823, and 831 to 833 in the width direction is approximately ⅓ of the width of the sample 80. The length of each of the measurement regions 811 to 813, 821 to 823, and 831 to 833 in the longitudinal direction is approximately equal to 20% of the total length of the sample 80 in the longitudinal direction (hereinafter, simply referred to as a "total length").

The measurement regions 811, 821, and 831 are located at generally the same position in the longitudinal direction. The centers of the measurement regions 811, 821, and 831 in the longitudinal direction are located at a distance approximately equal to 20% of the total length of the sample 80 upward from the lower end of the sample 80. The measurement regions 812, 822, and 832 are located at generally the same position in the longitudinal direction. The center of the measurement regions 812, 822, and 832 in the longitudinal direction is located at substantially the center of the sample 80 in the longitudinal direction. The measurement regions 813, 823, and 833 are located at generally the same position in the longitudinal direction. The centers of the measurement regions 813, 823, and 833 in the longitudinal direction are located at a distance approximately equal to 20% of the total length of the sample 80 downward from the upper end of the sample 80.

Figure 8:
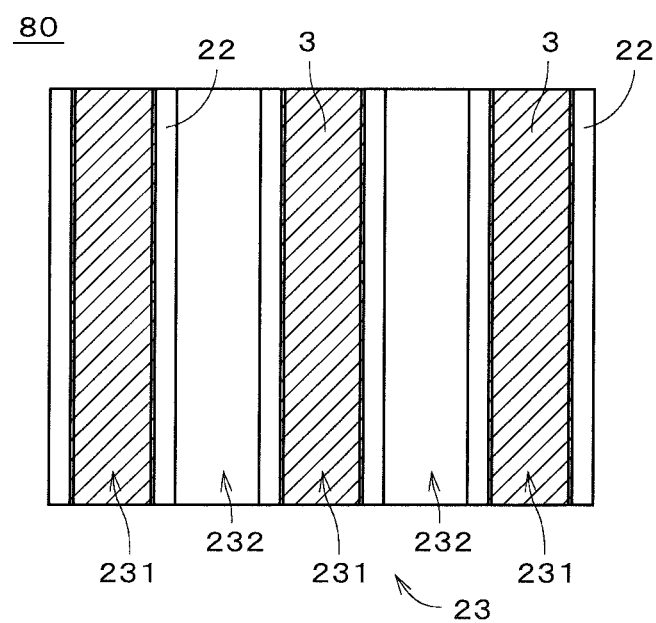
FIG. 8 is a view schematically illustrating part of the sample.

Next, at an arbitrary point in the measurement region 821, the main face of the sample 80 is imaged by a 3D-shape measuring device (one-shot 3D measuring macroscope VR-3200 manufactured by Keyence Corporation) at a predetermined magnification (e.g., 25× magnification). FIG. 8 is a view schematically illustrating an image obtained by the 3D-shape measuring device. In this image, three first cells 231 and two second cells 232 are arranged alternately in the width direction. In FIG. 8, the collection layer 3 of each first cell 231 is indicated by hatching in order to facilitate understanding of the drawing. In FIG. 8, sections of the collection layer 3 on the partition wall 22 are indicated by thick lines.

On the basis of the image illustrated in FIG. 8, the 3D-shape measuring device calculates the arithmetic mean height Sa of the surface of the collection layer 3 in one first cell 231 in the image. Specifically, the arithmetic mean height Sa of the strip region which extends in the longitudinal direction at the center of the first cell 231 in the width direction is calculated. The calculated arithmetic mean height Sa is obtained as Sa of the collection layer 3 in the measurement region 821. The values of Sa of the collection layer 3 calculated for respective first cells 231 in the image illustrated in FIG. 8 are generally the same. The values of Sa of the collection layer 3 measured in the measurement region 821 by variously changing the imaging point by the 3D-shape measuring device are generally the same. The same is true for the other measurement regions 811 to 813, 822 to 823, and 831 to 833.

After the Sa of the collection layer 3 in the measurement region 821 is measured, the Sa of the collection layer 3 in each of the measurement regions 822 to 823 is measured by the same method. The Sa of the collection layer 3 in each of the measurement regions 811 to 813 is also measured by the same method. Then, the arithmetic mean of the values of Sa of the collection layer 3 in the six measurement regions (i.e., the measurement regions 811 to 813 and 821 to 823) is calculated, and this arithmetic mean is obtained as the above-mentioned overall Sa. The arithmetic mean of the values of Sa of the collection layer 3 in the two measurement regions on the outlet side (i.e., the measurement regions 813 and 823) is obtained as the above-mentioned outlet-side Sa. In the calculation of the overall Sa and the outlet-side Sa, the values of Sa of the collection layer 3 in the measurement regions 831 to 833 may be used instead of the values of Sa of the collection layer 3 in the measurement regions 811 to 813.

On the basis of the image illustrated in FIG. 8, the 3D-shape measuring device calculates, with respect to the thickness direction (i.e., the direction perpendicular to the paper surface of the drawing), the mean position of the surface of the collecting layer 3 in the first cell 231 located at the center of the image in the width direction and the mean positions of the surface of the partition wall 22 in the two second cells 232 adjacent to both sides of the first cell 231. Specifically, calculated are the mean position of the surface of the collecting layer 3 in the strip region which extends in the longitudinal direction at the center of the first cell 231 in the width direction and the mean position of the surface of the partition wall 22 in the strip region which extends in the longitudinal direction at the center of each second cell 232 in the width direction. Then, the mean thickness of the collection layer 3 in the first cell 231 is calculated by subtracting the arithmetic mean of the mean positions in the two second cells 232 from the mean position in the first cell 231. The calculated mean thickness is obtained as the mean thickness of the collection layer 3 in the measurement region 821. The mean thicknesses of the collection layer 3 calculated for respective first cells 231 in the image illustrated in FIG. 8 are generally the same. The mean thicknesses of the collection layer 3 measured in the measurement region 821 by variously changing the imaging point by the 3D-shape measuring device are generally the same. The same is true for the other measurement regions 811 to 813, 822 to 823, and 831 to 833.

After the mean thickness of the collection layer 3 in the measurement region 821 is measured, the mean thickness of the collection layer 3 in each of the measurement regions 822 to 823 is measured by the same method. The mean thickness of the collection layer 3 in each of the measurement regions 811 to 813 is also measured by the same method. Then, the arithmetic mean of the mean thicknesses of the collection layer 3 in the six measurement regions (i.e., the measurement regions 811 to 813 and 821 to 823) is calculated, and this arithmetic mean is obtained as the above-mentioned overall mean thickness. The arithmetic mean of the mean thicknesses of the collection layer 3 in the two measurement regions on the outlet side (i.e., the measurement regions 813 and 823) is obtained as the above-mentioned outlet-side mean thickness. In the calculation of the overall mean thickness and the outlet-side mean thickness, the mean thicknesses of the collection layer 3 in the measurement regions 831 to 833 may be used instead of the mean thicknesses of the collection layer 3 in the measurement regions 811 to 813.

In the porous composite 1 illustrated in FIGS. 1 and 2, the gas flowing into the porous composite 1 flows into the first cells 231 from the inlets of the first cells 231 whose inlet sides are not sealed, and flows from the first cells 231 through the collection layer 3 and the partition wall 22 into the second cells 232 whose outlet sides are not sealed, as indicated by arrows A1 in FIG. 2. At this time, particulate matter in the gas is efficiently collected in the collection layer 3.

Next, one example of the method of producing the porous composite 1 will be described with reference to FIG. 9. In the case of producing the porous composite 1, first, the outer surface of the tubular outer wall 21 of the base material 2 is covered with a liquid-impermeable sheet member. For example, a liquid-impermeable film is wrapped around generally the entire outer surface of the tubular outer wall 21.

Then, raw slurry for forming the collection layer 3 is prepared (step S11). The raw slurry is prepared by mixing, for example, particles as a raw material of the collection layer 3 (hereinafter, referred to as "collection-layer particles"), particles of a pore-forming agent, and a flocculating agent with water. The collection-layer particles include, for example, particles of silicon carbide (SiC) or cerium oxide ($CeO_2$). The raw slurry contains particles (hereinafter, referred to as "flocculated particles") formed by flocculating, for example, collection-layer particles and particles of the pore-forming agent. In the case of preparing the raw slurry, the type and amount of the flocculating agent to be added, for example, are determined such that the particle diameter of the flocculated particles becomes greater than the mean pore diameter of the base material 2. This prevents or suppresses the flocculated particles from entering the pores of the base material 2 in step S12 described later. The viscosity of the raw slurry is, for example, in the range of 2 mPa·s to 30 mPa·s.

Next, the raw slurry is supplied to the first cells 231 in which the collection layer 3 is to be formed, among the cells 23 of the base material 2, from the inlets of the first cells 231 (i.e., the end portions that do not have the sealing parts 24) (step S12). The water in the raw slurry flows through the partition wall 22 of the base material 2 to the adjacent second cells 232 and flows out of the base material 2 from the end portions of the second cells 232 on the side where the sealing parts 24 are not provided. The flocculated particles in the raw slurry do not pass through the partition wall 22 and adhere to the inner surfaces of the first cells 231 to which the raw slurry has been supplied. This forms an intermediate in which the flocculated particles adhere generally uniformly to the inner surfaces of the first cells 231 of the base material 2.

After the supply of a predetermined amount of the raw slurry is completed, the intermediate from which water has run out is dried (step S13). For example, the intermediate is first dried at room temperature for 12 hours and then further dried by being heated at 80° C. for 12 hours. Thereafter, the intermediate is fired so that the collection-layer particles in a large number of flocculated particles adhering to the base material 2 are bonded together and spread to the surface of the base material 2, forming the porous collection layer 3 (step S14). In this firing step, the particles of the pore-forming agent contained in the collection layer 3 are removed by combustion, so that pores are formed in the collection layer 3. In step S14, the firing temperature is, for example, 1200° C. and the firing time is, for example, 2 hours.

The arithmetical mean height Sa of the surface of the collection layer 3 formed in step S14 can be adjusted, for example, by changing the time required from the start of supply of the raw slurry in step S12 to the completion of formation of the intermediate (i.e., the completion of water outflow from the base material 2). The completion of formation of the intermediate is, for example, the time point when, in continuous measurement of the weight of the base material 2 after the supply of the raw slurry, the measured weight is reduced to a predetermined weight. In the method of producing the porous composite 1, the above-mentioned arithmetic mean height Sa becomes smaller, for example, by shortening the time required from the start of supply of the raw slurry in step S12 to the completion of formation of the intermediate. The shortening of the required time is realized, for example, by sucking the base material 2 with a suction device or the like in step S12 to promote the outflow of water in the raw slurry to the outside of the base material 2.

Next, the relationship of the arithmetic mean height Sa (i.e., the overall Sa and the outlet-side Sa) and mean thickness (i.e., the overall mean thickness and the outlet-side mean thickness) of the collection layer 3 to the pressure loss and collection efficiency in the porous composite 1 will be described with reference to Tables 1 and 2.

TABLE 1

| | | Example 1 | Example 2 | Example 3 | Example 4 | Example 5 | Example 6 | Example 7 |
|---|---|---|---|---|---|---|---|---|
| Base material | Material | Cordierite | Cordierite | Cordierite | Cordierite | Cordierite | Cordierite | Cordierite |
| | Pore diameter (μm) | 11 | 12 | 12 | 12 | 12 | 12 | 12 |
| | Porosity (%) | 48 | 48 | 48 | 48 | 48 | 48 | 48 |
| Collection layer | Material | SiC | SiC | SiC | SiC | SiC | $CeO_2$ | $CeO_2$ |
| | Overall Sa (μm) | 5 | 11 | 6 | 4 | 5 | 4 | 6 |
| | Outlet-side Sa (μm) | 7 | 14 | 8 | 6 | 7 | 5 | 9 |
| | Overall mean thickness (μm) | 32 | 30 | 32 | 36 | 39 | 31 | 27 |
| | Outlet-side mean thickness (μm) | 46 | 38 | 33 | 45 | 47 | 36 | 39 |
| | Mean pore diameter (μm) | 4.8 | 5.4 | 4.7 | 4.0 | 6.1 | 4.1 | 3.2 |
| | Porosity (%) | 72 | 77 | 71 | 71 | 79 | 72 | 67 |
| | Diameter of aggregate (μm) | 3 | 3 | 3 | 3 | 3 | 2 | 2 |
| Collection efficiency | | ◎ | ◎ | ○ | ◎ | Δ | ◎ | ◎ |
| Initial pressure loss | | ○ | Δ | ○ | Δ | ○ | ○ | Δ |

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| Base material | Material | Cordierite | Cordierite | Cordierite | Cordierite | Cordierite | Cordierite |
|  | Pore diameter (μm) | 12 | 12 | 12 | 12 | 12 | 12 |
|  | Porosity (%) | 48 | 48 | 48 | 48 | 48 | 48 |
| Collection layer | Material | SiC | SiC | SiC | SiC | SiC |  |
|  | Overall Sa (μm) | 15 | 41 | 5 | 5 | 6 |  |
|  | Outlet-side Sa (μm) | 23 | 84 | 6 | 6 | 8 |  |
|  | Overall mean thickness (μm) | 32 | 70 | 42 | 49 | 43 |  |
|  | Outlet-side mean thickness (μm) | 45 | 98 | 53 | 58 | 57 |  |
|  | Mean pore diameter (μm) | 4.0 | 5.8 | 5.4 | 5.5 | 3.7 |  |
|  | Porosity (%) | 73 | 78 | 77 | 77 | 70 |  |
|  | Diameter of aggregate (μm) | 3 | 3 | 3 | 3 | 3 |  |
| Collection efficiency |  | ◎ | Δ | ◎ | ◎ | ◎ | × |
| Initial pressure loss |  | × | × | × | × | × | — |

In Examples 1 to 7, the chief material of the base material 2 is cordierite, and the mean pore diameter and the porosity are 12 μm and 48%, respectively. In Examples 1 to 5, the chief material of the collection layer 3 is SiC, and in Examples 6 to 7, the chief material of the collection layer 3 is CeO$_2$.

In Examples 1 to 7, the overall Sa of the collection layer 3 is 4 μm to 11 μm, and the outlet-side Sa is 5 μm to 14 μm. The overall mean thickness of the collection layer 3 is 27 μm to 39 μm, and the outlet-side mean thickness is 33 μm to 47 μm. The mean pore diameter of the collection layer 3 is 3.2 μm to 6.1 μm, and the porosity is 67% to 79%. The mean particle diameter of the aggregate constituting the collection layer 3 is 2 μm to 3 μm.

In Comparative Examples 1 to 6, as with Examples 1 to 7, the chief material of the base material 2 is cordierite, and the mean pore diameter and the porosity are 12 μm and 48%, respectively. In Comparative Examples 1 to 5, the chief material of the collection layer 3 is SiC, and in Comparative Example 6, the collection layer 3 is not provided. That is, the porous composite 1 of Comparative Example 6 is composed of only the base material 2 made of cordierite.

In Comparative Examples 1 to 5, the overall Sa of the collection layer 3 is 5 μm to 41 μm, and the outlet-side Sa is 6 μm to 84 μm. The overall mean thickness of the collection layer 3 is 32 μm to 70 μm, and the outlet-side mean thickness is 45 μm to 98 μm. The mean pore diameter of the collection layer 3 is 3.7 μm to 5.8 μm, and the porosity is 70% to 78%. The mean particle diameter of the aggregate constituting the collection layer 3 is 3 μm.

In Comparative Examples 1 and 2, the overall Sa of the collection layer 3 is greater than 12 μm, and the outlet-side Sa is also greater than 15 μm. In Comparative Examples 2 to 5, the overall mean thickness of the collection layer 3 is greater than 40 μm, and the outlet-side mean thickness is also greater than 50 μm.

In Examples 1 to 7 and Comparative Examples 1 to 6, it is determined whether the collection efficiency of particulate matter by the porous composite 1 is favorable or not, and whether the suppression of initial pressure loss is favorable or not (that is, whether the increase percentage of the initial pressure loss is large or small). The collection efficiency is obtained as follows. First, the porous composite 1 of each of Examples and Comparative Examples is mounted as a GPF in the exhaust system of a passenger vehicle having a direct-injection gasoline engine with a displacement of 2 liters, and a vehicle test is conducted using a chassis dynamometer. In the vehicle test, the number of emitted particulate matter in the exhaust gas in driving in the European regulation driving mode (RTS95) is measured by a measurement method in accordance with PMP (particulate measurement protocol for European regulation). Additionally, the same vehicle test is conducted without mounting the GPF in the above-mentioned exhaust system, and the number of emitted particulate matter in the exhaust gas is measured by the same measurement method. With the number of emitted particulate matter in the case without the GPF as a "reference number of emitted particulate matter", for each of Examples and Comparative Examples, a value (%) obtained by dividing the difference between the measured number of emitted particulate matter and the reference number of emitted particulate matter by the reference number of emitted particulate matter is determined as a "collection efficiency (%)."

The increase percentage of the initial pressure loss is obtained as follows. First, while air at room temperature is supplied to the porous composite 1 of each of Examples and Comparative Examples at a flow rate of 10 Nm$^3$/min, the pressure difference between the front side and the back side of the porous composite 1 (i.e., a differential pressure between the inlet side and the outlet side of air) is measured. Then, the increase percentage of the pressure difference in each of Examples and Comparative Examples to the pressure difference in Comparative Example 6 (only the base material 2) is obtained as an "increase percentage of the initial pressure loss" in the porous composite 1. Specifically, the increase percentage (%) of the initial pressure loss is obtained by (A−B)/B×100, where A is the pressure difference in each of Examples and Comparative Examples and B is the pressure difference in Comparative Example 6.

In Tables 1 and 2, the results of the collection efficiency are indicated by symbols. Specifically, the result where the collection efficiency is greater than or equal to 92.5% is indicated by "◎ (double circle)", and the result where the collection efficiency is greater than or equal to 90% and less than 92.5% is indicated by "○ (circle)". The result where the collection efficiency is greater than or equal to 87.5% and less than 90% is indicated by "Δ (triangle)", and the result where the collection efficiency is less than 87.5% is indicated by "X (cross)".

In Tables 1 and 2, the results of suppression of the initial pressure loss are also indicated by symbols. Specifically, the result where the increase percentage of the initial pressure loss is less than 10% is indicated by "○ (circle)", and the result where the increase percentage of the initial pressure loss is greater than or equal to 10% and less than 13% is indicated by "Δ (triangle)". The result where the increase percentage of the initial pressure loss is greater than or equal to 13% is indicated by "X (cross)".

In Example 1, the collection efficiency is greater than or equal to 92.5%, and the increase percentage of the initial pressure loss is less than 10%, both of which are favorable. In Example 2, the collection efficiency is greater than or equal to 92.5%, which is favorable, and the increase percentage of the initial pressure loss is greater than or equal to 10% and less than 13%, which is acceptable. A conceivable reason why the increase percentage of the initial pressure loss is slightly high in Example 2 is that the overall Sa and outlet-side Sa of the collection layer 3 are greater than 10 μm. In Example 3, the collection efficiency is greater than or equal to 90% and less than 92.5%, and the initial pressure loss is less than 10%, both of which are favorable. A conceivable reason why the collection efficiency is slightly low in Example 3 is that the outlet-side mean thickness of the collection layer 3 is less than 35 μm.

In Example 4, the collection efficiency is greater than or equal to 92.5%, which is favorable, and the increase percentage of the initial pressure loss is greater than or equal to 10% and less than 13%, which is acceptable. A conceivable reason why the increase percentage of the initial pressure loss is slightly high in Example 4 is that the mean pore diameter of the collection layer 3 is less than 4.1 μm. In Example 5, the collection efficiency is greater than or equal to 87.5% and less than 90%, which is acceptable, and the increase percentage of the initial pressure loss is less than 10%, which is favorable. Conceivable reasons why the collection efficiency is slightly low in Example 5 are that the mean pore diameter of the collection layer 3 is greater than 6 μm and that the porosity is greater than 78%. In Example 6, the collection efficiency is greater than or equal to 92.5%, and the increase percentage of the initial pressure loss is less than 10%, both of which are favorable. In Example 7, the collection efficiency is greater than or equal to 92.5%, which is favorable, and the increase percentage of the initial pressure loss is greater than or equal to 10% and less than 13%, which is acceptable. A conceivable reason why the increase percentage of the initial pressure loss is slightly high in Example 7 is that the mean pore diameter of the collection layer 3 is less than 4.1 μm.

On the other hand, in Comparative Examples 1 to 5, the increase percentage of the initial pressure loss is as high as greater than or equal to 13%. Conceivable reasons why the increase percentage of the initial pressure loss is excessively high in Comparative Example 1 are that the overall Sa is greater than 12 μm and that the outlet-side Sa is greater than 15 μm. Conceivable reasons why the increase percentage of the initial pressure loss is excessively high in Comparative Example 2 are that the overall Sa is greater than 12 μm, that the outlet-side Sa is greater than 15 μm, that the overall mean thickness is greater than 40 μm, and that the outlet-side mean thickness is greater than 50 μm. Conceivable reasons why the increase percentage of the initial pressure loss is excessively high in each of Comparative Examples 3 to 5 are that the overall mean thickness is greater than 40 μm and that the outlet-side mean thickness is greater than 50 μm. In Comparative Example 6, since the collection layer 3 is not provided, the collection efficiency is as low as less than 87.5%.

As described above, the porous composite 1 includes the porous base material 2, and the porous collection layer 3 formed on the base material 2. The base material 2 has a honeycomb structure whose inside is partitioned by the partition wall 22 into the plurality of cells 23 extending in the longitudinal direction. The plurality of cells 23 include the plurality of first cells 231 whose one ends in the longitudinal direction are sealed, and the plurality of second cells 232 whose other ends in the longitudinal direction are sealed, the plurality of first cells 231 and the plurality of second cells 232 being arranged alternately. The collection layer 3 covers the inner surfaces of the plurality of first cells 231. The overall Sa that is an arithmetical mean height Sa indicating a surface roughness of the surface of the collection layer 3 in the plurality of first cells 231 is greater than or equal to 0.1 μm and less than or equal to 12 μm.

This makes it possible to reduce the frictional resistance between the gas flowing in the first cells 231 and the collection layer 3. As a result, it is possible to reduce the pressure loss in the porous composite 1. Further, the unevenness of the surface of the collection layer 3 in the circumferential direction is reduced at each position of the first cells 231 in the longitudinal direction. As a result, the uniformity of the collection of particulate matter in the circumferential direction can be improved at the each position, so that the collection efficiency of particulate matter in the porous composite 1 can be improved. Since the surface of the collection layer 3 becomes smooth, it is possible to prevent the surface layer portion of the collection layer 3 from being chipped or cracked. As a result, the durability of the porous composite 1 can be improved.

Additionally, in the porous composite 1, the overall mean thickness that is a mean thickness of the collection layer 3 in the plurality of first cells 231 is greater than or equal to 10 μm and less than or equal to 40 μm. This makes it possible to suppress an increase in the pressure loss due to the thickening of the collecting layer 3 and to suppress a decrease in the collecting efficiency due to the thinning of the collecting layer 3. In other words, it is possible to further reduce the pressure loss in the porous composite 1 and to further improve the collection efficiency.

As described above, the outlet-side Sa that is an arithmetical mean height Sa of the surface of the collection layer 3 at end portions in the plurality of first cells 231 is preferably greater than or equal to 0.1 μm and less than or equal to 15 μm, the end portions being located on a side of the one ends (i.e., outlet side) in the longitudinal direction. Since the surface roughness on the outlet side where the pressure is high at the initial stage of collecting particulate matter is reduced as above, it is possible to further reduce the pressure loss in the porous composite 1 and to further improve the collecting efficiency.

As described above, the outlet-side mean thickness that is a mean thickness of the collection layer 3 at the above end portions (i.e., the end portions on the outlet side) in the plurality of first cells 231 is preferably greater than or equal to 35 μm and less than or equal to 50 μm. This makes it possible to yet further reduce the pressure loss in the porous composite 1 and to yet further improve the collecting efficiency.

As described above, the collection layer 3 in the plurality of first cells 231 preferably has a mean pore diameter greater than or equal to 0.1 μm and less than or equal to 20 μm. This makes it possible to suppress an increase in the pressure loss due to the decreasing of the mean pore diameter and to suppress a decrease in the collecting efficiency due to the increasing of the mean pore diameter. In other words, it is possible to further reduce the pressure loss in the porous composite 1 and to further improve the collecting efficiency.

As described above, the collection layer 3 in the plurality of first cells 231 preferably has a porosity greater than or equal to 50% and less than or equal to 90%. This makes it possible to efficiently suppress the increase in the pressure loss in the porous composite 1.

As described above, the aggregate of the collection layer 3 in the plurality of first cells 231 preferably has a mean particle diameter greater than or equal to 0.1 µm and less than or equal to 5 µm. This makes it possible to further reduce the pressure loss in the porous composite 1 and to further improve the collecting efficiency.

As described above, the collection layer 3 in the plurality of first cells 231 preferably contains at least one of silicon carbide, cordierite, mullite, aluminum oxide, silicon oxide, titanium oxide, zirconium oxide, iron oxide, and cerium oxide. Since the collection layer 3 is formed using a ceramic material having relatively high heat resistance as above, it is possible to suitably perform the production of the porous composite 1 including the firing step.

As described above, it is preferable that the collection layer 3 doesn't exist in the plurality of second cells 232. This makes it possible to prevent unnecessary increase of the pressure loss in the porous composite 1.

As described above, the chief material of the base material 2 is preferably cordierite. Preferably, the partition wall 22 has a mean pore diameter greater than or equal to 5 µm and less than or equal to 30 µm, and the partition wall 22 has a porosity greater than or equal to 30% and less than or equal to 70%. This makes it possible to properly achieve reduction of the pressure loss and improvement of the collecting efficiency in the porous composite 1.

As described above, the porous composite 1 can reduce the pressure loss and improve the collection efficiency. Accordingly, the porous composite 1 is in particular suitable for use as a GPF for collecting particulate matter in an exhaust gas emitted from a gasoline engine.

The porous composite 1 described above may be modified in various ways.

The structure of the porous composite 1 may be changed in various ways. For example, the collection layer 3 may be provided on the inner surfaces of all of the cells 23.

The applications of the porous composite 1 are not limited to the above-mentioned GPF, and the porous composite 1 may be used as any other filter such as a diesel particulate filter (DPF). As another alternative, the porous composite 1 may be used in applications other than filters.

Figure 9:
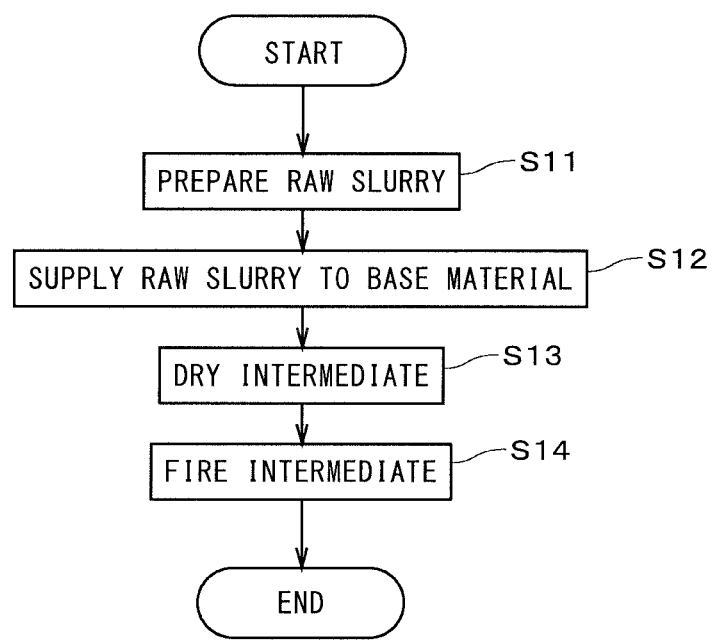
FIG. 9 is a flowchart of production of the porous composite.

The method of producing the porous composite 1 is not limited to the one illustrated in FIG. 9 and may be changed in various ways. For example, in step S12, the method of supplying the raw slurry to the base material 2 may be changed in various ways. The supply of the raw material of the collection layer 3 to the base material 2 is not limited to a filtering system using the raw slurry, and may be conducted by various methods such as dipping, spraying, or drying. The drying method and the drying time of the intermediate in step S13 and the firing temperature and the firing time of the intermediate in step S14 may also be changed in various ways.

The configurations of the preferred embodiments and variations described above may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

INDUSTRIAL APPLICABILITY

The present invention is applicable to a filter for collecting particulate matter, for example, a gasoline particulate filter for collecting particulate matter in an exhaust gas emitted from a gasoline engine.

REFERENCE SIGNS LIST

1 Porous composite
2 Base material
3 Collection layer
22 Partition wall
23 Cell
231 First cell
232 Second cell
S11 to S14 Step

The invention claimed is:

1. A porous composite comprising:
a porous base material; and
a porous collection layer formed on said base material,
wherein said base material has a honeycomb structure whose inside is partitioned by a partition wall into a plurality of cells extending in a longitudinal direction,
said plurality of cells include a plurality of first cells whose one ends in the longitudinal direction are sealed, and a plurality of second cells whose other ends in the longitudinal direction are sealed, said plurality of first cells and said plurality of second cells being arranged alternately,
said collection layer covers inner surfaces of said plurality of first cells,
an overall Sa that is an arithmetical mean height Sa indicating a surface roughness of a surface of said collection layer in said plurality of first cells is greater than or equal to 0.1 µm and less than or equal to 12 µm, and
an overall mean thickness that is a mean thickness of said collection layer in said plurality of first cells is greater than or equal to 10 µm and less than or equal to 40 µm.

2. The porous composite according to claim 1, wherein an outlet-side Sa that is an arithmetical mean height Sa of the surface of said collection layer at end portions in said plurality of first cells is greater than or equal to 0.1 µm and less than or equal to 15 µm, said end portions being located on a side of said one ends in the longitudinal direction.

3. The porous composite according to claim 2, wherein an outlet-side mean thickness that is a mean thickness of said collection layer at said end portions in said plurality of first cells is greater than or equal to 35 µm and less than or equal to 50 µm.

4. The porous composite according to claim 1, wherein said collection layer in said plurality of first cells has a mean pore diameter greater than or equal to 0.1 µm and less than or equal to 20 µm.

5. The porous composite according to claim 1, wherein said collection layer in said plurality of first cells has a porosity greater than or equal to 50% and less than or equal to 90%.

6. The porous composite according to claim 1, wherein an aggregate of said collection layer in said plurality of first cells has a mean particle diameter greater than or equal to 0.1 µm and less than or equal to 5 µm.

7. The porous composite according to claim 1, wherein said collection layer in said plurality of first cells contains at least one of silicon carbide, cordierite, mullite, aluminum oxide, silicon oxide, titanium oxide, zirconium oxide, iron oxide, and cerium oxide.

8. The porous composite according to claim 1, wherein said collection layer doesn't exist in said plurality of second cells.

9. The porous composite according to claim 1, wherein a chief material of said partition wall is cordierite, said partition wall has a mean pore diameter greater than or equal to 5 μm and less than or equal to 30 μm, and said partition wall has a porosity greater than or equal to 30% and less than or equal to 70%.

10. The porous composite according to claim 1, being a gasoline particulate filter for collecting particulate matter in an exhaust gas emitted from a gasoline engine.

* * * * *